(12) United States Patent
Tingle

(10) Patent No.: US 9,847,928 B2
(45) Date of Patent: Dec. 19, 2017

(54) VERIFYING CONNECTOR PLACEMENT VIA LOOPBACK SCHEMAS

(71) Applicant: Alcatel-Lucent USA, INC., Murray Hill, NJ (US)

(72) Inventor: Nicholas W. Tingle, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 45 days.

(21) Appl. No.: 14/501,359

(22) Filed: Sep. 30, 2014

(65) Prior Publication Data

US 2016/0094432 A1    Mar. 31, 2016

(51) Int. Cl.
*H04L 12/26* (2006.01)

(52) U.S. Cl.
CPC .......... *H04L 43/50* (2013.01); *H04L 43/0811* (2013.01)

(58) Field of Classification Search
None
See application file for complete search history.

(56) References Cited

U.S. PATENT DOCUMENTS

| | | | | |
|---|---|---|---|---|
| 5,394,503 A * | 2/1995 | Dietz, Jr. | ............ | G02B 6/3895 385/134 |
| 5,559,427 A * | 9/1996 | Hinds | ................. | G01R 31/021 324/519 |
| 5,687,013 A * | 11/1997 | Henmi | ............... | H04Q 11/0062 370/237 |
| 5,859,850 A * | 1/1999 | Lien | ................... | H04Q 11/0478 370/396 |
| 6,404,740 B1 * | 6/2002 | Yoshida | ............. | H04L 12/2697 370/241.1 |
| 6,532,328 B1 * | 3/2003 | Kline | ...................... | H01B 7/36 385/101 |
| 6,777,952 B2 * | 8/2004 | Seymour | ............. | G01R 31/021 324/525 |
| 7,016,947 B1 * | 3/2006 | Ah Sue | ............... | H04L 12/5601 370/224 |
| 7,274,702 B2 | 9/2007 | Toutant et al. | | |
| 7,576,548 B1 * | 8/2009 | Lo | ........................ | G01R 31/021 324/533 |
| 7,586,856 B1 * | 9/2009 | Thottakkara | ............ | H04L 45/48 370/244 |
| 7,620,858 B2 | 11/2009 | Kushnick | | |
| 7,818,387 B1 * | 10/2010 | King | .................... | G06F 11/0766 709/208 |
| 7,906,973 B1 * | 3/2011 | Orr | ...................... | H04L 12/2697 324/527 |

(Continued)

*Primary Examiner* — Ayaz Sheikh
*Assistant Examiner* — Tarell Hampton
(74) *Attorney, Agent, or Firm* — Kramer & Amado, P.C.

(57) ABSTRACT

A method and system for verification of connector placement via loopback schemas is disclosed. The method for verification of connector placement via loopback schemas applies a schema to the loopback facilities associated with the signaling pairs at a particular port, with the schema being identified at the remote end of a cable connected to the port via a connectivity test, and the resulting schema identifying the port connected thereto. The method and system for verification of connector placement via loopback schemas provides advantages over systems known in the art positively identifying a particular port while eliminating the requirement for detailed connector labeling.

14 Claims, 3 Drawing Sheets

(56) References Cited

U.S. PATENT DOCUMENTS

| | | |
|---|---|---|
| 8,015,458 B2 | 9/2011 | Johnsen et al. |
| 9,172,624 B1* | 10/2015 | Naik .................... H04L 43/0811 |
| 2004/0151120 A1* | 8/2004 | Shankar .................. H04L 49/90 |
| | | 370/249 |
| 2005/0001179 A1* | 1/2005 | Gisler ................. G06F 13/4072 |
| | | 250/551 |
| 2005/0215119 A1* | 9/2005 | Kaneko .............. G06K 7/10178 |
| | | 439/607.01 |
| 2006/0277324 A1* | 12/2006 | Aldereguia ......... G06F 13/4072 |
| | | 710/1 |
| 2008/0100467 A1* | 5/2008 | Downie ............... G02B 6/3895 |
| | | 340/686.2 |
| 2008/0159738 A1* | 7/2008 | Lavranchuk ......... G02B 6/3895 |
| | | 398/17 |
| 2008/0318465 A1* | 12/2008 | Johnsen .................. G06F 11/30 |
| | | 439/488 |
| 2012/0307651 A1 | 12/2012 | Su et al. |

\* cited by examiner

VERIFYING CONNECTOR PLACEMENT VIA LOOPBACK SCHEMAS

FIELD OF THE INVENTION

The invention relates to connectorizing equipment and is particularly concerned with verifying and troubleshooting accurate inter-equipment connector placement.

BACKGROUND OF THE INVENTION

It is common in telecommunications systems to rely on signal cables and connectors to provide optical and electrical connections between equipment which cannot be connected via backplanes.

When connecting multiple chassis together such as connecting multiple service routers to form a combined service router, a problem arises wherein a very large number of signal cables and other cables between the two or more chassis must be routed correctly. Connection involves connector placement at a port on a first chassis, then routing of the interconnecting cable to a second chassis, and finally connector placement at a port on the second chassis.

Modern network equipment may utilize a plurality of these connecting cables. For example, the Alcatel-Lucent 7050 XRS-40 uses a total of 112 interconnecting optical cables between two equipment shelves mounted in racks, where the racks may be separated as far as 100 meters from each other. Proper placement of these connectors can be prone to errors due to the sheer quantity of connectors which have to be placed. Errors in connector placement can be very costly in terms of time and equipment problems. As such connections are typically made in the field at a customer site, time is often of the essence and connection problems may only compound other installation issues.

At present, optical cabling terminations may be color-coded, numbered or otherwise identified to assist in the interconnection process. This solution is insufficient due to the enormous number of cables involved in some chassis to chassis interconnections. Further, in the event a complex color-coding or numbering scheme is employed, the issue of spare cables arises with attendant problems of color-coding and/or numbering these spares.

More expensive solutions include embedding an RFID tag in each optical cable terminating point/connector, wherein the RFID tags are processed to ensure appropriate connection. This solution is very cost intensive and requires specialized equipment as well as modifications to cables, connectors, and chassis.

Therefore, there exists a need to overcome the drawbacks associated with avoiding improper connector placement methods as discussed above.

SUMMARY OF THE INVENTION

It is an object of the invention to provide a method and system for identifying a port to which a cable is connected.

According to a first aspect of the invention there is disclosed a method for remotely identifying a port having multiple signaling pairs, and having a plurality of loopback facilities; each pair of the multiple signaling pairs having a respective loopback facility, the method having the steps of applying a schema to the plurality of loopback facilities associated with the port; connecting a cable to the port at a proximal end; performing a connectivity test from the distal end of the cable, wherein the connectivity test determines the schema applied to the loopback facilities associated with the port; and identifying the port according to the schema so determined.

In some embodiments of this aspect of the invention the signaling pairs are optical, while in other embodiments the signaling pairs are electrical.

In other embodiments of this aspect of the invention a separate individual test of each respective loopback facility associated with the port is conducted.

According to another aspect of the invention there is disclosed a system for identifying a port having multiple signaling pairs; a plurality of loopback facilities; each pair of the multiple signaling pairs having a respective loopback facility; a schema applied to the plurality of loopback facilities associated with the port; a cable to the port at a proximal end; a connectivity tester at the distal end of the cable, wherein the connectivity tester determines the schema applied to the loopback facilities associated with the port; and an indication of the identification of the port according to the schema so determined.

In some embodiments of this aspect of the invention the signaling pairs are optical, while in other embodiments the signaling pairs are electrical.

In other embodiments of this aspect of the invention there is a individual connectivity tester which verifies the operation of each respective loopback facility associated with the port.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, where.

DETAILED DESCRIPTION

In the following description, numerous specific details are set forth. However, it is understood that embodiments of the invention may be practiced without these specific details. In other instances, well-known assemblies, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such a feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

In general in the description of the figures, like reference numbers are used to represent like elements.

Figure 1:
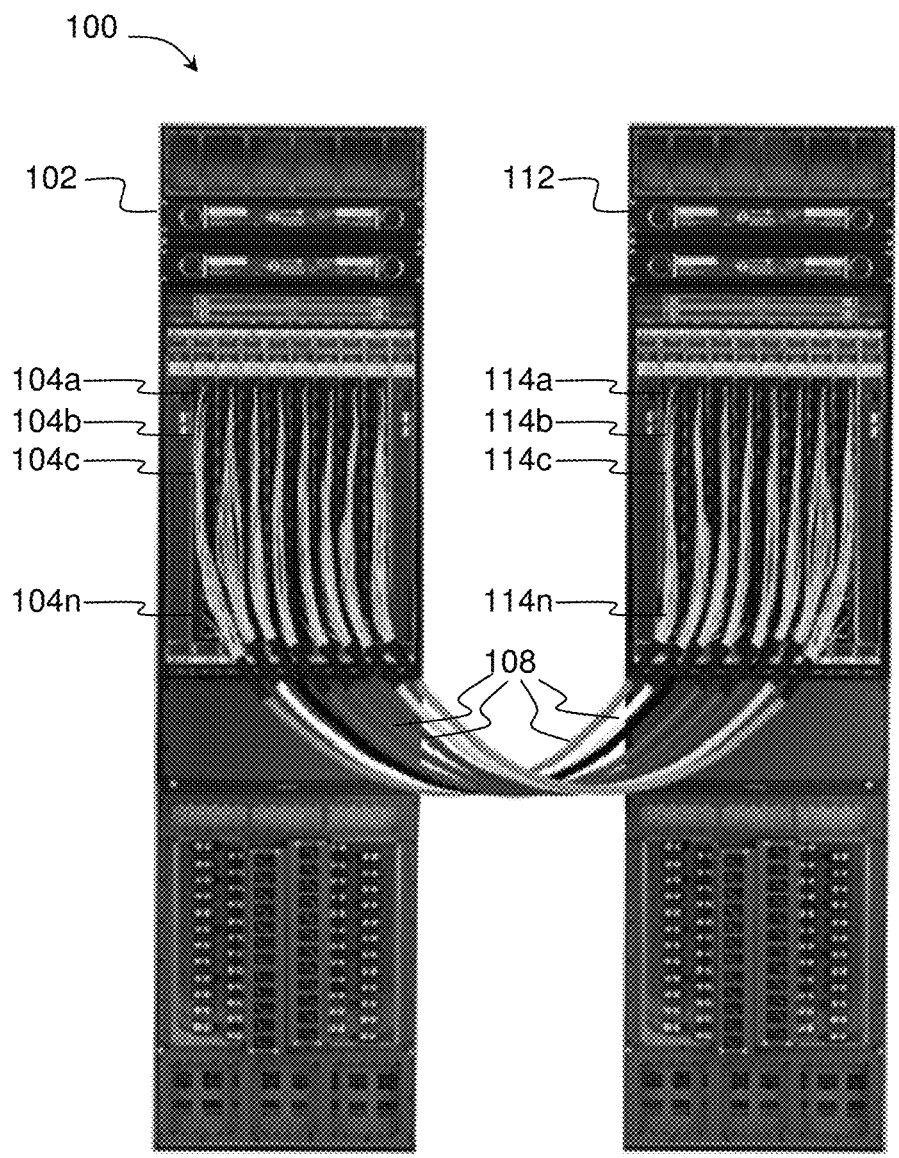
FIG. 1 illustrates first and second equipment rack according to the prior art having cables interconnecting the racks.

Referring now to FIG. 1 there may be seen an elevation view 100 of an exemplary pair of equipment chassis 102 and 112. In this instance the exemplary pair of equipment chassis are Alcatel-Lucent 7950 Extensible Routing System equipment racks. The equipment chassis are connected via signaling cables, each cable having connectors at each end. These connectors are fitted into port connectors on cards mounted within the equipment chassis. Referring again to FIG. 1, there may be seen a plurality of connectors 104a, 104b, 104c, . . . 104n at chassis 102. Each of these connectors terminates a plurality of Transmit (Tx)-Receive (Rx) pairs. These Tx-Rx pairs may be optical cables or electronic cables. The pairs from the connectors are bundled into larger cable assemblies 108 which traverse the intervening distance between the equipment chassis.

The distance between chassis varies dependent upon installation requirement, but may span a distance of up to 100 meters in some instances. The large separation distances in such installations can make coordination of connector placement between a distal and remote chassis increasingly error prone.

At the other equipment chassis 112 there may be seen the respective ends of the connectors 114a, 114b, 114c, . . . 114n. At issue in these installations is that the connectors at chassis 112 are to be placed in their appropriate connector ports. Misplacement of a first connector will necessarily result in a misplacement of a second connector that should have been connected to the port the first connector had occupied. Cascading effects can then occur with one misplaced connector causing a second, the second causing a third, and so on.

Figure 2:
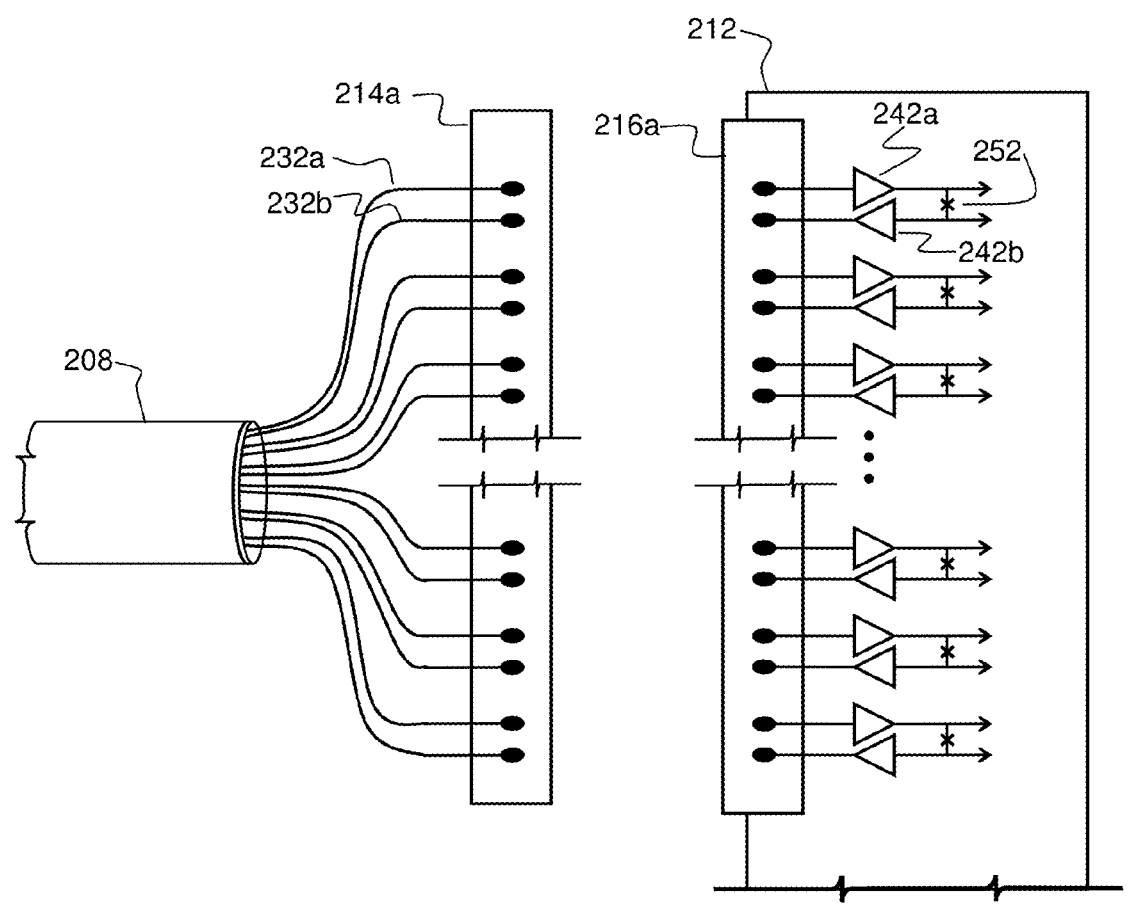
FIG. 2 illustrates an exemplary cable connector having a plurality of Tx and Rx signal pairs and a corresponding port connector with associated Tx and Rx circuitry for receiving the cable connector according to an embodiment of the invention.

Referring now to FIG. 2 there may be seen a schematic view of the end of a cable 208 having a plurality of Tx-Rx pairs terminating in connector 214a. A particular Tx signaling line 232a and Rx signaling line 232b may be seen terminating on the connector 214a. The signaling lines may be optical in nature, in which case a single fiber would suffice, or may be electrical in nature which would possibly incorporate a pair of wires for each signaling line.

Also depicted in FIG. 2 is chassis 212 having port connector 216a. Port connector 216a has corresponding receiving 242a and transmit 242b circuitry connected to the termination points within port connector 216a. Also shown is loopback facility 252 between the respective output of receiving circuitry 242a and transmit circuitry 242b. Loopback facility 252 comprises circuitry which can steer the incoming signal received on the connector, back out of the connector on the outgoing signal path. This circuitry may be contained in integrated circuits or provided via discrete components. The ability to place a particular signaling pair in loopback mode is controlled by circuitry which may be invoked by test functions or by operator control. This form of loopback is also termed "external loopback" as opposed to a loopback using the switching fabric of a facility. "External loopback" means that a signal arriving at the receive side of the channel will be retransmitted unchanged on the transmit side of the same channel. The state of each signaling channel (looped back or not) can then be determined from the far end chassis by using a simple connectivity test.

In some embodiments, the loopback facility provided is within the cable connector proper. In other embodiments the loopback facility provided is one the port connector side of the connection. Some loopback facilities perform a loopback at a data level, for example, the loopback for an optical signal actually occurring after the optical signal has been converted to its electrical equivalent. All such loopback facilities will work with different embodiments of the invention.

Figure 3A:
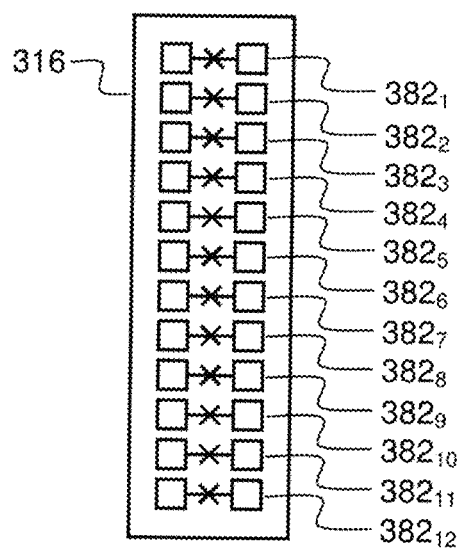
FIGS. 3a and 3b illustrates an exemplary view of a port connector having Tx and Rx pairs some of which pairs are in a loopback state according to an embodiment of the invention.
Figure 3B:
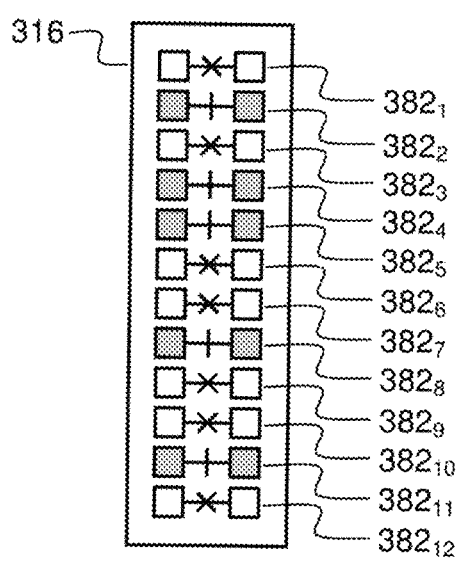

Referring now to FIGS. 3a and 3b there may be seen a status depiction of a connector 316 having a plurality of Tx-Rx signaling connections $382_1, 382_2, 382_3, \ldots, 382_{12}$. The status of the loopback facility between each Tx-Rx pair is indicated by the standard symbol for an open connection. In FIG. 3a, none of the Tx-Rx pairs $382_1, 382_2, 382_3, \ldots, 382_{12}$ have been placed in loopback mode. In FIG. 3b, by way of contrast, a total of five of the Tx-Rx signaling pairs have been place in loopback mode, namely Tx-Rx pairs $382_2, 382_4, 382_5, 382_5$, and $382_{11}$.

In embodiments of the invention, the schema consisting of which Tx-Rx pairs have been placed in loopback mode is used to identify the identity of the port that the cable is connected into. The allocation of schemas to ports can utilize whatever sort of mapping an operator finds most appropriate. For example, the ports may be assigned a number and the schema associated with that port may be the binary representation of that port number in terms of a loopback condition indicating a binary "1" and a non-loopback condition indicating a binary "0". Alternatively binary coding could be used with the assigned meaning of the loopback conditions the opposite to what has been described.

From basic mathematical principles it is apparent that a connector having n signaling pairs will be able to distinguish $2^n$ different schemas. By way of example, a connector having 12 Tx-Rx pairs would be able to be assigned any of $2^{12}$ or 4,096 different schemas. Alternatively, a connector having only 8 Tx-Rx pairs would be able to be assigned any of $2^8$ or 256 different schemas. This quantity of schemas will typically suffice in most installations to allow unique identifiers to be associated with each port.

In the event that there were insufficient schemas to fully differentiate the ports, the likelihood of such misconnections can be decreased by the $2^n$ factor by using embodiments of the invention.

Alternatively, in the event that there are more schemas than possible misconnect destinations, extra schema bits may be used to detect errors, for example as parity bits. Alternatively, in practice this could mean that schemas assigned to different ports differ from each other by more than a single bit, thereby reducing the probability that a single faulty signal path could inadvertently resemble another valid port location.

In operation, the ports on the remote chassis are placed into distinguishing loopback schemas, and when cables are connected the ports on the near chassis perform a connectivity test to determine which signaling pairs have been placed in loopback mode to determine which schema is in effect at the port at the remote end of the cable. If the schema corresponds to the expected port, then the cable has been properly connected. If the schema does not correspond to the expected port, then the obtained schema may be used to determine which port the cable connector has been erroneously connected to.

In operation it may be that there are failures in the loopback facilities associated with a particular port connector. The loopback facility may be unable to perform the loopback function, or alternatively may be permanently stuck in loopback mode. To verify whether or not this is the case, and to distinguish faulty loopback facilities from actual schemas, a simple connectivity test may be performed. This test would comprise testing each of the single pairs within a connector to ensure that the loopback facility for each pair is operating effectively. This pair loopback facility test could be performed in anticipation of any schema determining test so as to not obtain erroneous schema measurement. Alternatively, a periodic alternating of a loopback schema with an all signaling pairs placed in loopback mode would allow verification of both connectivity of signaling paths and the correct pattern for the port.

As will be recognized by those skilled in the art, embodiments of the present invention not only identify that a cable has been misconnected, but also provide information on which port it has been actually connected to. This allows a service person to immediately proceed to the location of the misconnection for the purposes of remedial action.

In accordance with another contemplated embodiment, in operation the operator would connect the two equipments in any 1:1 manner that is most convenient. Then an embodiment of the invention would perform an assessment of the actual connections of the cables, providing the operator with a mapping which can be used to operate the cables as installed. This embodiment would eliminate the possibility of misconnection by permitting a connector to port mapping for both pieces of the equipment, thus facilitating more rapid installation.

Accordingly what has been disclosed is a method and apparatus for distinguishing the port a cable connector has been connected to. In particular, by reading the schema or pattern of Tx-Rx loopback status across the optical or electrical signaling pairs in a connector, the particular port connector may be distinguished.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for remotely identifying a port having multiple signaling pairs, and having a plurality of loopback facilities; each pair of said multiple signaling pairs having a respective loopback mode, the method comprising the steps of:
    applying a schema to each of the plurality of loopback facilities associated with said port, the schema including a representation of which signaling pairs have been placed in loopback mode, wherein the representation is a binary representation of a port number;
    connecting a cable to said port at a first end of the cable;
    performing a connectivity test from a second end of said cable wherein the connectivity test determines when the cable is connected to said port at the first end of the cable all signaling pairs of the schema applied to said loopback facilities associated with within said port; and
    identifying said port according to the schema so determined, wherein the identified port is an expected that corresponds to the applied schema.

2. A method as claimed in claim 1 wherein said signaling pairs are optical.

3. A method as claimed in claim 1 wherein said signaling pairs are electrical.

4. A method as claimed in claim 1 further comprising an individual test of each respective loopback facility associated with said port.

5. A method as claimed in claim 1 wherein said loopback facilities are external loopback facilities that include a signal arriving at a receive side of a channel of the port is retransmitted unchanged on a transmit side of the same channel of the port.

6. A system for identifying a port having comprising:
    multiple signaling pairs;
    a plurality of loopback facilities associated with said port;
    a schema applied to each of the plurality of loopback facilities associated with said port, the schema including a representation of which signaling pairs have been placed in loopback mode wherein the representation is a binary representation of a port number;
    a cable to said port at a first end of the cable;
    a connectivity tester at a second end of said cable, wherein the connectivity tester determines when the cable is connected all signaling pairs of the schema applied to said loopback facilities associated with said port; and
    an indication of the identification of said port according to the schema so determined, wherein the identified port is an expected port that corresponds to the applied schema.

7. A system as claimed in claim 6 wherein said signaling pairs are optical.

8. A system as claimed in claim 6 wherein said signaling pairs are electrical.

9. A system as claimed in claim 6 further comprising a individual connectivity tester which verifies the operation of each respective loopback facility associated with said port.

10. A system as claimed in claim 6 wherein said loopback facilities are external loopback facilities that include a signal arriving at a receive side of a channel of the port is retransmitted unchanged on a transmit side of the same channel of the port.

11. The method as claimed in claim 1, wherein the representation is a binary representation of the port number.

12. The method as claimed in claim 1, wherein the identifying includes identifying said port according to a mapping of a port number and the schema so determined.

13. The system as claimed in claim 6, wherein the representation is a binary representation of the port number.

14. The system as claimed in claim 6, wherein the identification includes said port identified according to a mapping of a port number and the schema so determined.

* * * * *